FIP8102 OR 3,919,643

X 5288 X 5295C X 5088 E X 5300 E X 5055 N

United States Patent [19]

Templin

[11] 3,919,643

[45] Nov. 11, 1975

[54] PHASE SENSOR CIRCUIT

[75] Inventor: Lawrence R. Templin, La Mirada, Calif.

[73] Assignee: Hughes Aircraft Company, Culver City, Calif.

[22] Filed: Jan. 28, 1974

[21] Appl. No.: 437,436

Related U.S. Application Data

[62] Division of Ser. No. 251,232, May 8, 1972, Pat. No. 3,794,941.

[52] U.S. Cl. .................... 325/150; 317/43; 333/17

[51] Int. Cl.[2] .................................... H03G 11/04

[58] Field of Search.................. 317/43, 48, 31–33; 325/133, 134, 150, 151, 174, 187; 328/55, 56, 8, 9, 10; 333/17, 18 R

[56] References Cited

UNITED STATES PATENTS

| | | | |
|---|---|---|---|
| 3,366,883 | 1/1968 | Griffin et al. | 325/150 X |
| 3,475,703 | 10/1969 | Kennedy et al. | 333/17 |
| 3,786,355 | 1/1974 | Midkiff | 325/174 |

*Primary Examiner*—Benedict V. Safourek
*Attorney, Agent, or Firm*—Richard J. Rengel; W. H. MacAllister, Jr.

[57] ABSTRACT

A phase sensor circuit for detecting the phase of antenna impedance during signal transmission over a broad frequency band and providing a digital output for indicating a capacitive or inductive antenna load at any selected frequency of transmission in the band. Digital circuitry provides different time delay paths for sampled signal transmission and the output signal train of the different paths are combined to reduce pulse width at the pulse repetition rate. Sampled transmission is derived at a level to provide sufficient signal over the broad frequency band for required sensors including voltage samples and voltage analog samples of current. The tuning of the antenna for matching to the power amplifier is detected by individual phase and impedance broad band sensors for sequencing of capacitive and inductive reactances of an impedance matching network to approach 0° phase and the desired load resistance for efficient power transfer. Tuning is continuously monitored by a voltage standing wave ratio (VSWR) sensor which initiates and controls the duration of tuning cycles according to the detected antenna impedance matching condition.

14 Claims, 4 Drawing Figures

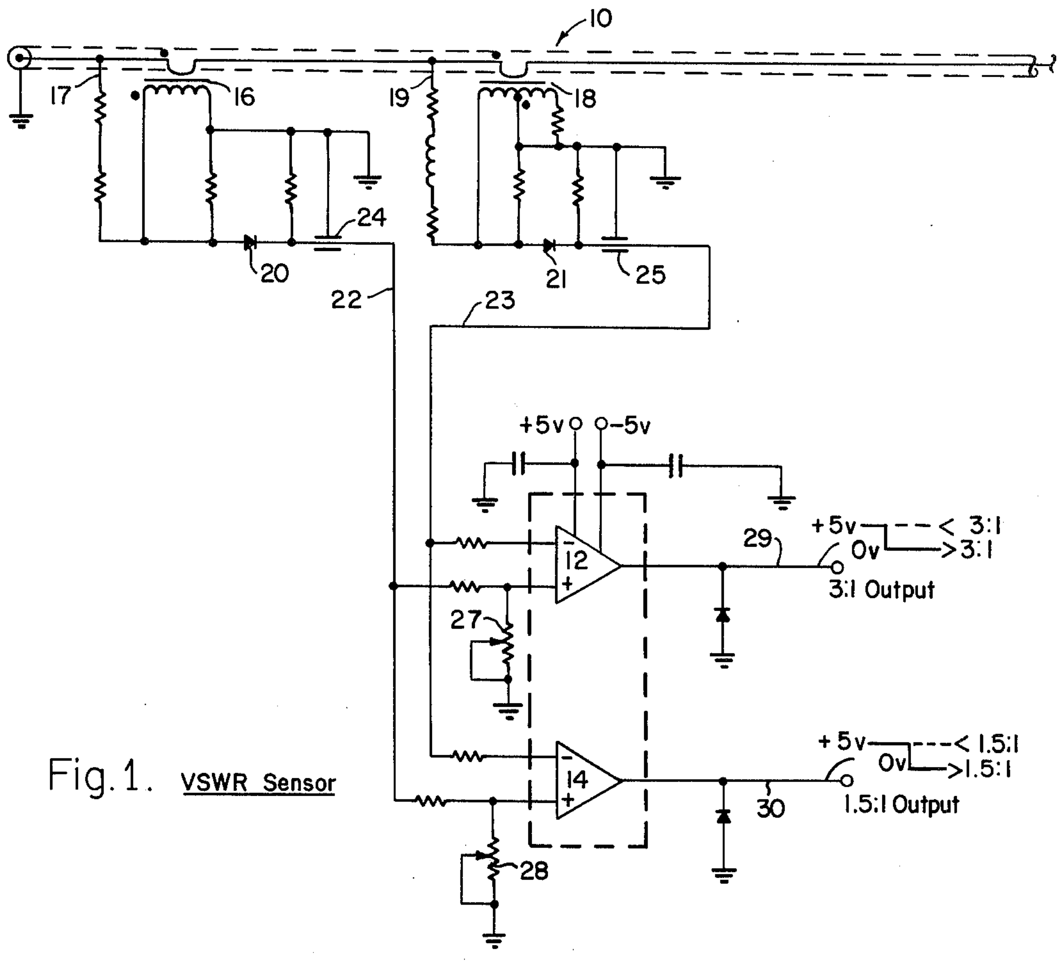
Fig. 1. VSWR Sensor
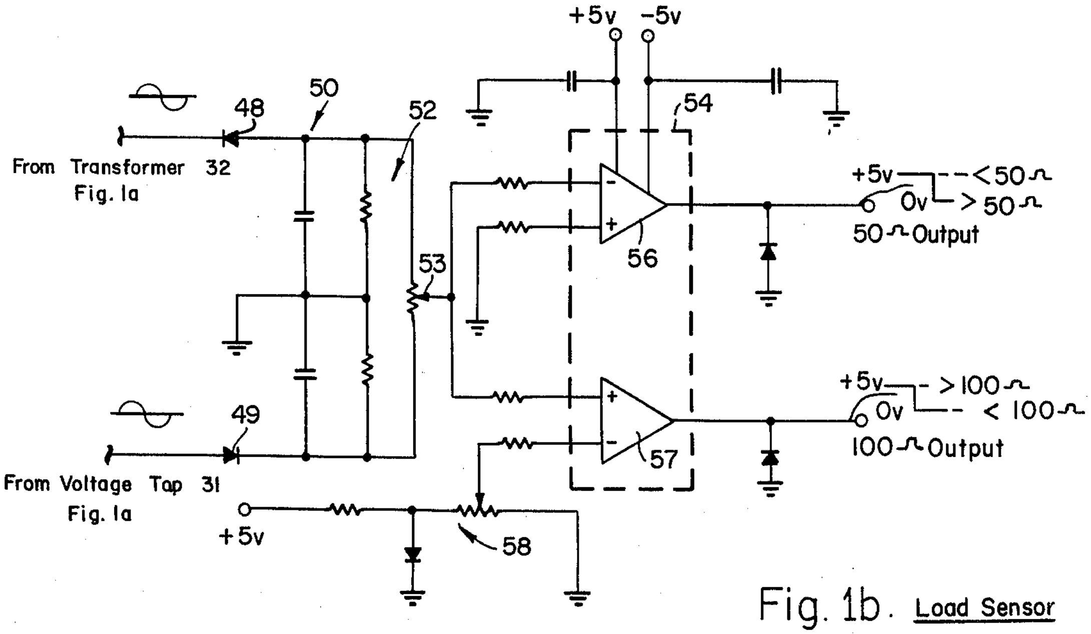
Fig. 1b. Load Sensor

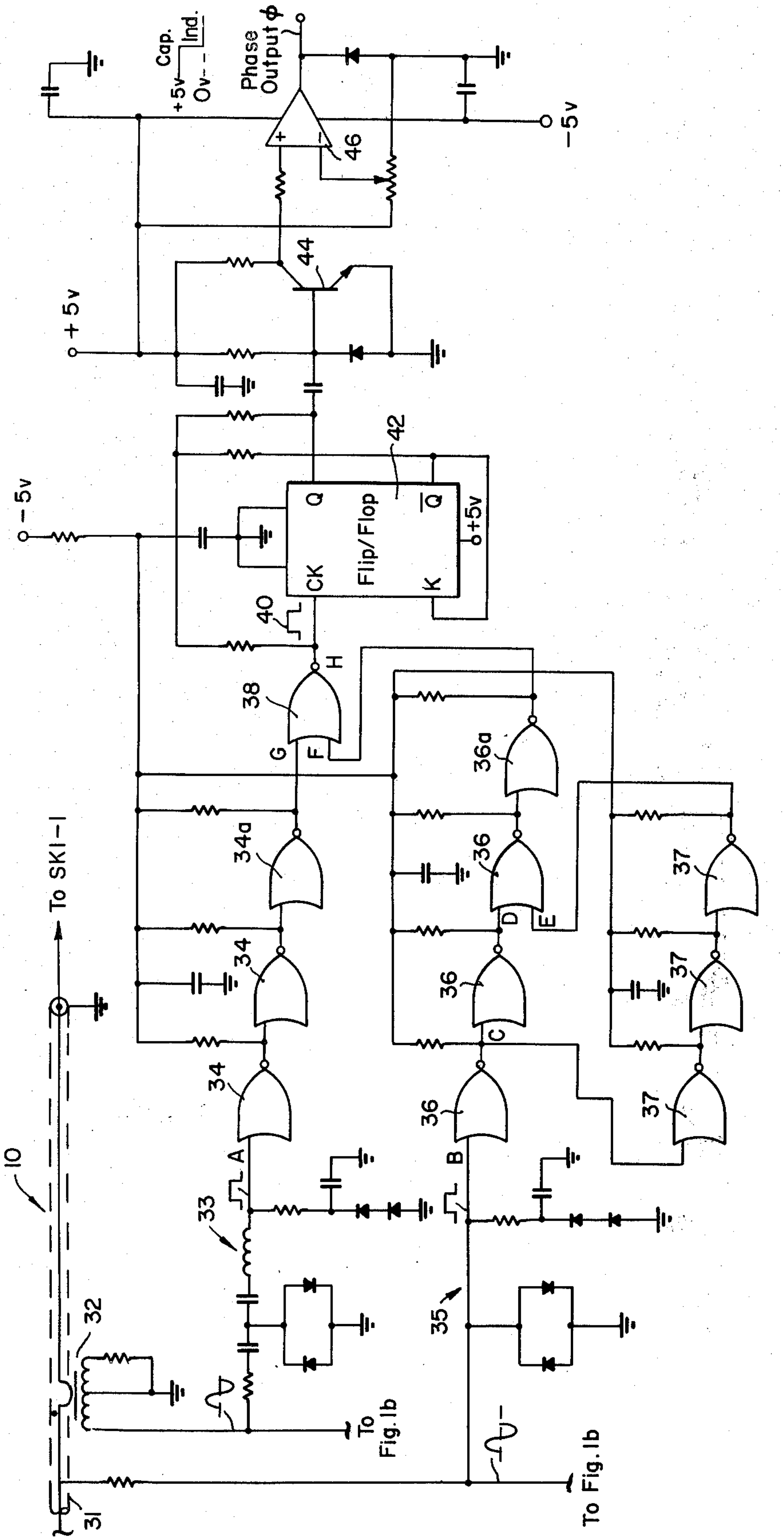
Fig.1a. Phase φ Sensor

PHASE SENSOR CIRCUIT

This application is a division of copending U.S. application Ser. No. 251,232, filed May 8, 1972, now U.S. Pat. No. 3,794,941, issued Feb. 26, 1974.

BACKGROUND OF THE INVENTION

In order to provide an efficient transfer of power from the power amplifier of a radio transmitter to its antenna, antenna tuning must be provided to achieve the efficient power transfer. Accordingly, the function of the antenna tuner is to transform the impedance of the antenna to the load reactance required for the power amplifier output stage of the transmitter.

One of the difficulties of the prior art is to provide sampling for sensing of the condition of tuning over the frequency band for tuning without changing the tuning condition, i.e., deriving voltage and current samples of adequate level for sensing without becoming a significant load over the frequency range of tuning.

Another difficulty of prior art phase sensing was to provide phase detection over a broad frequency band, e.g. 2–80 MHz, or to provide digital, phase sensing signal outputs.

SUMMARY OF THE INVENTION

In the preferred embodiment of the automatic tuner of the present invention, a completely automatic tuner has been provided that matches accurately any one of five different antenna configurations, for example, to the output of the transmitter power amplifier.

A VSWR detector provides information relative to the tuned condition having been reached and remains operative during all transmission intervals. The monitoring of the tuner by the VSWR detector also provides for inhibiting high power during a period of transmission should a subsequent mismatch arise in the tuner, for example, due to a change of position of the transceiver.

Individual phase and load sensors are provided to detect voltage and current samples of the transmitted signal to provide positive and negative decisions with regard to phase, and impedance above or below either 100 ohm or 50 ohm impedance references, respectively. The 100 ohm reference is provided for selecting a proper preload reactance for preloading the selected antenna below 50 MHz of the broad frequency range of 2 to 80 MHz. The preload arrangement consists of a rotary switch which is indexed in response to the sensor outputs and the indexing continues until a reactance selected provides the L matching network with an antenna input impedance of approximately 100 ohms. After the proper preload impedance is obtained, the phase and 50 ohm impedance load sensor outputs provide logic level outputs to direct the relay control logic to insert and remove both inductance and capacitance elements in a binary sequence in the L matching network to provide the proper combination, out of $2 \times 10^6$ possible combinations, for at least a 1.5:1 VSWR operating condition which is detected by the VSWR sensor.

The selected method for control of the tuning circuit elements requires two inputs, i.e., phase and impedance inputs indicative of the reactive condition of the selected antenna. The phase input is provided by the phase sensor which supplies a digital signal to the logic control circuits for switching capacitors in the antenna impedance matching network. The other control loop is responsive to the detected impedance provided by the load sensor which directs the logical control to switch the inductors in the antenna impedance matching network. The phase and impedance control loops are quasi-independent and are capable of operating simultaneously to reduce the time period of the tuning cycle. Since the inductive and capacitive elements are incremented in value digitally, the logical control is operated in a binary counting sequence, i.e., individual counters for inductive and capacitive components control the switching for insertion and removal of the individual capacitors and inductors in the impedance matching networks.

In view of the foregoing, it is an object of the present invention to provide a phase sensor and an impedance load sensor and standing wave ratio detector for an antenna tuner having the foregoing features and advantages.

Another object is to provide for detecting the phase of antenna impedance.

Another object of the present invention is the provision of digital logic in the output of a phase detector.

Other objects and features of the invention will become apparent to those skilled in the art as the disclosure is made in the following detailed description of a preferred embodiment of the invention.

BRIEF DESCRIPTION OF THE DRAWINGS

FIG. 1 is a circuit diagram of a standing wave ratio sensor of the preferred embodiment of the present invention for detecting the voltage standing wave ratio in an antenna coupling and tuning network for initiating and controlling the duration of a tuning cycle;

FIG. 1*a* is a diagram of a phase sensor of the preferred embodiment for sensing the phase of the reactive component in the antenna coupling network and providing control signals for tuning to eliminate any excessive reactive antenna component;

FIG. 1*b* is a circuit diagram of a load sensor for detecting antenna impedance components for controlling the inductive reactance in a tuning cycle of the preferred embodiment of the present invention.

Referring now to the drawings, FIGS. 1, 1*a* and 1*b* illustrate schematically VSWR, phase and load impedance sensing circuits for automatic sensing of antenna parameters including selected antenna frequency preload requirements. In general, these circuits provide broadband coverage of frequencies from 2 to 80 MHz for antennas of widely differing impedance and each having substantial impedance excursions over the band of frequencies, e.g., varying impedance characteristics in the range of 60 ohms to 1,500 ohms at about 26 MHz for 6 and 9 foot whip antennas. Two of the sensing circuits, the phase and load sensors shown in FIGS. 1*a* and 1*b*, provide independent and simultaneous detection of impedance and phase antenna parameters to provide digital control signals for individual steering of logic circuits controlling capacitive and inductive tuning elements, respectively. The remaining sensor (VSWR) monitors the antenna voltage standing wave ratio for starting and terminating tuning cycles, for transmission in the frequency range of the broadband frequency coverage.

Figure 1C:
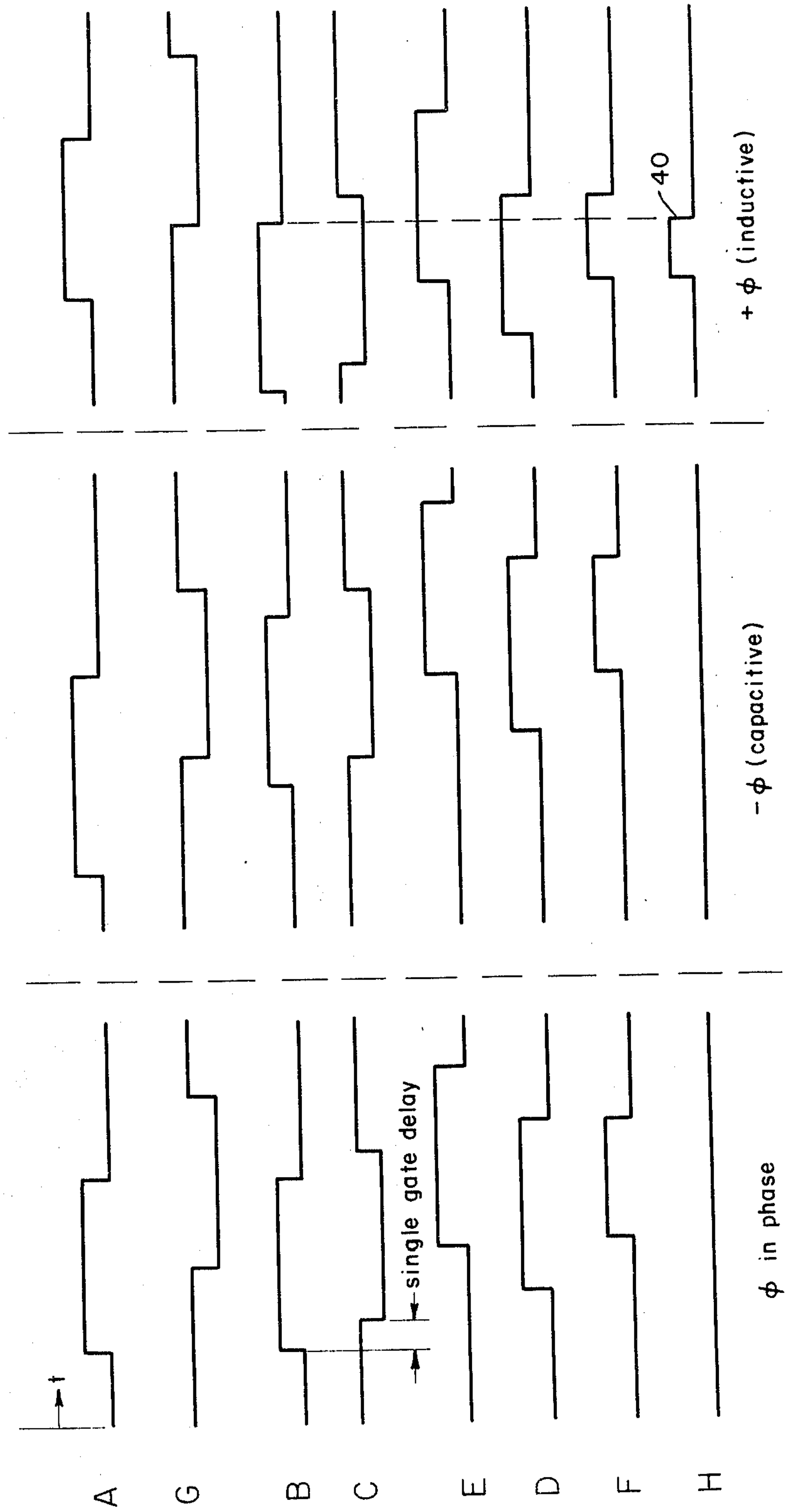
FIG. 1*c* is a timing diagram for illustrating the operation of the phase sensor shown in FIG. 1*a*.

Accordingly, the sensing circuits of FIGS. 1, 1*a* and 1*b* are directed to detecting selected antenna conditions at any selected operating frequency to produce feedback control signals for steering of logic circuits for digital sequencing of reactive components for tuning. Further, to satisfy the need for rapid tuning over a wide range of transmission frequencies, e.g., 2 MHz to 80 MHz, tuning is implemented by parallel sequencing of capacitive and inductive tuning elements in the high frequency (HF) band of 2–50 MHz. The phase and load sensors of FIGS. 1*a* and 1*b* independently analyze the impedance and phase components of the selected antenna and provide separate control signals to the logic control circuits for concurrent sequencing of the capacitors and inductors in the tuning circuit to provide a tuned condition at any selected transmission frequency.

As shown in FIGS. 1, 1*a* and 1*b*, low power, voltage and current carrier wave signals are coupled to each of the sensors from line taps on a transmission line 10 which is connected to an RF amplifier, requiring a 50 ohm output impedance for transmission over the broadband frequency range of 2 to 80 MHz. The transmission line tap interruptions are preferably contained in a minimum length of line so that the sample input signals track over the frequency range. In general, the circuitry and packaging of the sensors maintain minimum losses to enhance the broadband frequency transmission range. For example, the transmission line 10 comprises a coaxial cable one-half inch in length with voltage taps andd toroidal transformers located within the length of the cable. Due to the transmission line taps and interruptions being contained in the minimum line length, sampled voltages track over the frequency range due to minimun change in losses or voltage level which directly effect the linearity and sensitivity of the sensors' outputs.

In FIG. 1 the VSWR sensor is shown to provide two outputs, namely, 3:1 and 1.5:1 outputs from respective operational amplifiers 12 and 14, each supplied voltage and current samples of the transmitted signal at the respective voltage and transformer couplings to the transmission line 10. Coupling transformers 16 and 18 are of opposite polarity to provide forward and reflected current signal samples. Signals from coupling transformer 16 and a DC voltage tap 17 are combined to produce a positive detached voltage corresponding to the forward transmission signal on transmission line 10. Signals from the other pair, coupling transformer 18 and voltage tap 19, are combined to produce a positive detected voltage corresponding to the reflected transmission signal on the transmission line 10. Diodes 20 and 21, in combination with their respective associated load resistors, produce the positive detected voltage on respective lines 22 and 23 for the forward and reflected signal samples. An AC filter is provided by capacitors 24 and 25 which are coupled to ground as shown to provide positive DC signals to the VSWR sensor.

The derived forward signal on line 22 is applied to the positive inputs of the dual DC operational amplifiers 12 and 14 and the derived reflected signal on line 23 is applied to the negative inputs. Each positive input of the dual operational amplifiers includes respective voltage dividers 27 and 28 for adjusting the threshold level of the respective amplifiers. Filtered voltage supplies of +5 and −5 volts are coupled to both of the amplifiers as shown for amplifier 12, and the outputs are limited by diodes coupled to output lines 29 and 30. Operational amplifier 14 provides the 1.5:1 VSWR output wherein the higher level of the control signal indicates a voltage standing wave ratio of 1.5:1 or less for terminating the tuning cycle. As long as this 1.5:1 output remains at the lower logical level (0v), the tuning cycle will continue as controlled by digital control circuitry in response to phase and impedance sensor outputs as described later.

The other control signal output from operational amplifier 12, on output line 29, provides a low logical level control signal indicating the voltage standing wave ratio of greater than 3:1 which can be used to signal the operator to begin the new tuning cycle or alternatively can provide a start signal for initiating a tuning cycle.

Referring now to FIG. 1*a*, the circuit for detecting the phase of the antenna impedance is designated the phase sensor which derives voltage and current (voltage) signal samples from the transmission line at voltage tap 31 and current transformer 32. As in the VSWR sensor of FIG. 1, a low power carrier wave signal (e.g., 2 watts) is required to provide sensor input signals. The voltage sample taken at tap 31 of transmission line 10 is applied undetected to the phase sensor of FIG. 1*a* and is also coupled to the load sensor of FIG. 1*b* after detection. Also, as discussed in connection with the VSWR sensor of FIG. 1, the transformer 32 is connected in series with the transmission line 10 for extracting a sample for detecting any phase of the antenna reactance by the phase sensor of FIG. 1*a* and is also applied to the load sensor of FIG. 1*b* after detection.

In the phase sensor, FIG. 1*a*, the signal supplied by the transformer 32 is capacitively coupled through an isolation network 33 to a series of three NOR gates 34. These gates 34 and the remaining gates shown in FIG. 1*a* provide fast rise times and constant amplitude pulse waveforms over the full frequency range of operation. A gate of this type is supplied by Motorola Semiconductor Division as a "MECL III" gate.

The other input to the phase sensor is the voltage sample supplied from the voltage tap 31 which is coupled into the phase sensor through a constant load network 35. This voltage sample is then coupled to a gating arrangement including NOR gates 36 and 37 to produce a fixed delay which delayed signal is applied to input F of a summing gate 38.

A timing diagram in FIG. 1c illustrates the operation of the series of gates for deriving a pulse output from the summing gate 38 in response to signal samples derived from transformer 32 and voltage tap 31. As shown by the third column of waveforms, indicated $+\phi$ (inductive), a positive pulse 40 is produced at the output H of summing gate 38 only when the transformer signal sample A lags the voltage tap sample B to provide a positive pulse train at the output H of the summing gate 38 (FIG. 1*a*). The letters A–G are also shown in FIG. 1a as inputs to certain ones of the gates in the network. Thus, when transformer and voltage signal smaples are in phase, as shown in column 1 of FIG. 1*c*, or a negative phase angle is exhibited between sample signals, as shown in column 2 of FIG. 1*c*, no pulse output is produced at the output H of summing gate 38. Accordingly, a pulse train results only from a positive phase angle and leading or lagging signals correspond to the antenna appearing either inductive or capacitive and detection of the inductive condition produces the pulse train at the output H.

The output of summing gate 38 is applied to clock input CK of flip flop 42 having interconnected J–K inputs which provide a pulse output Q at one-half the input pulse rate. While the pulse rate is decreased, the circuit gain is increased to control a driver 44 which is AC coupled to the output Q. The output of the driver 44 is applied to the + input of a high gain DC operational amplifier 46 having a − input which is coupled to a threshold adjustment to compensate for individual circuit parameters and to precisely place the threshold level at 0°. The positive input to operational amplifier 46 integrates the pulse train input to provide the digital output signal as shown, in which the high logical level (+5v) is indicative of a capacitive antenna load ($-\phi$) and the low logical level (0v) is indicative of an inductive antenna load ($+\phi$).

Operational amplifier 46 has a high gain and implemented for fast crossover from capacitive to inductive levels, i.e., occurs within + or −6° about the in phase or 0° phase differential over the broad band frequency range. As noted earlier, the transmission line taps and interruptions are contained in a minimum line length, e.g., preferably one-half inch, and less than three-quarters of an inch, to provide for sample signals from transmission line 10 which track over the frequency range of 2–80 MHz. Any change in losses or voltage level directly affects the linearity and sensitivity of the sensor outputs.

Referring to FIG. 1*b*, the load sensor is supplied sample signals from voltage tap 31 and transformer 32 on transmission line 10. Whereas the phase sensor independently analyzes the phase angle of the antenna load, the load sensor shown in FIG. 1*b* is responsive to the sample signals from transmission line 10 to analyze the impedance component of the antenna load under the phase conditions to provide a separate control signal to the inductive sequence logic for insertion of inductive elements including tuning transformers in a T matching network for an antenna which may include a preload section of the T network.

The input circuit to the load sensor detects transformer and voltage tap signals. The two signals are diode detected in opposite senses by diodes 48, 49 in the input circuit 50, which detected signals are summed in a common load 52. The voltage level at adjustable tap 53 of the load resistor is applied to opposite inputs of a dual DC operational amplifier 54 including amplifiers 56 and 57. The voltage from tap 53 is applied to the − input of amplifier 56 to provide a digital output having a high logical level (+5v) indicating an antenna load of less than 50 ohms and a low logical level (0v) indicating an antenna load of greater than 50 ohms. The 50 ohm output is a command signal which can be applied to the inductive sequence logic of the high frequency of digital control circuits.

The voltage level at tap 53 is applied to the + input of amplifier 57 to provide a digital signal at the 100 ohm output wherein the high level signal indicates an antenna load of greater than 100 ohms and the lower level signal indicates an antenna load of less than 100 ohms. This digital signal from the 100 ohm output is a command signal from the load sensor to antenna preload control circuits of an antenna tuner. The negative input to the amplifier 57 is coupled to a threshold adjustment circuit 58 to provide an offset bias whereby the circuit operation can be adjusted precisely to detect a 100 ohm impedance and produce a change in level at the output at 100 ohms.

The time period required for tuning is minimized by the use of automatic sensing of antenna parameters and any preload requirement. By parallel sensing of phase and impedance parameters by individual sensors, a tuning cycle is substantially reduced including an average preload tuning time interval of one-half second and an L matching network tuning time interval of .8 second, or a total average time period of a tune cycle of 1.3 seconds. At the present time reduction of the time period of the tuning cycle is limited primarily by relay activation time and as solid state devices become available, which can tolerate the resonant power conditions, the tuning cycle time period will be decreased substantially.

One of the more important features of the present invention is the broad frequency range of the sensing circuits, particularly, the monitoring of the antenna reactances continuously to provide a rapid, flat response over the full frequency range enabling accurate tuning to voltage standing wave ratios (VSWR) of less than 1.5:1. Also, independent and simultaneous sensing and control of the real and reactive antenna components reduces the time period of the tuning cycle approximately 50%. Accordingly, in addition to having the individual sensing circuits, separate logical control circuits for controlling the inductive and capacitive tuning elements is derived from the two independent phase and load sensors whose operation is quasi-independent.

The provision of broad band sensor circuits is important in providing for monitoring of antenna reactances continuously while also providing rapid, flat response over the entire frequency range for accurate tuning to a standing wave ratio of less than 1.5:1. Further, independently and simultaneously sensing and switching of the real and reactive antenna components reduces the tuning time approximately 50%. This is accomplished by having two identical logic control circuit loops; one controlling the inductive and the other controlling the capacitive tuning elements as described in detail in my original application. The controlled inputs to these circuits are derived from two independent phase and impedance sensors.

The tuning cycle, therefore, is initiated only if the standing wave ratio, as sensed, is out of the acceptable limits, for example, 3:1. Upon determining that the standing wave ratio is greater than 3:1 a preload switch assembly is cycled and stopped at the first position at which a 100 ohm impedance crossover is sensed and the phase angle appears inductive $+\phi$. After the preload sequence, HF control logic cycles relay control inductive and capacitive elements through their values in binary increments simultaneously as directed by the phase and impedance sensors. The HF control circuits seek a zero phase angle and an antenna impedance of 50 ohms. As the phase and impedance is approached in the L-C combination, providing a standing wave ratio of less than 1.5:1 produced the VSWR output of 1.5:1 for terminating the tuning cycle, disconnecting the tuning power and providing an output for increasing the transmission power to a high level.

The basic tuning algorithm disclosed includes many improvements as disclosed by the preferred embodiment, and the relay control matrix and the sensors can be simplified or combined in any configuration as needed for this particular tuning requirements of the system under consideration.

Thus, at the time the tuning cycle is initiated, if the standing wave ratio is within the limits specified, the system automatically switches to high power transmission without tuning. On the other hand, if the standing wave ratio as sensed is out of limits, the tuning cycle is initiated. Normally the transceiver is provided with a tune switch, e.g., the microphone key and tuning is completed by the time the operator commences talking because of the short time interval of less than 3 seconds required for the tuning cycle. In the event a tuned condition cannot be attained which satisfies the standing wave ratio limits, the cycle is terminated and an indication is provided to the operator that the system has not been tuned. Also during monitored transmission, if the standing wave ratio exceeds the allowable limits, a command line is energized for signalling the operator.

In the light of the above teachings of the preferred embodiment disclosed, various modifications and variations of the present invention are contemplated and will be apparent to those skilled in the art without departing from the spirit and scope of the invention. Many of these variations have been discussed and as was noted, the particular application of the present invention to specific applications often determines the arrangement for simplification.

I claim:

1. A phase sensor circuit for detecting the phase of signal transmission comprising:

circuit means for sampling undetected voltage and current of said signal transmission capable of having loads of a capacitive or inductive phase angle to produce voltage and current samples;

phase detection circuit means comprising a reference circuit including at least one logical gating circuit for receiving one of said samples to provide a pulse output and a delay circuit including a plurality of logical gating circuits for receiving the other of said samples to provide a delayed pulse output; and a summing logical gating circuit means having an input for receiving the pulse outputs of said reference circuit and delay circuit to provide a pulsed output for one phase load and steady state output for the other phase load, in response to reference and delayed signals at the input of the summing circuit.

2. The phase sensor circuit according to claim 1 in which the phase detection circuit means further includes output circuit means for receiving the output of the summing circuit and having an adjustable threshold, said output circuit means being adjusted to provide a threshold corresponding to the transition between capacitive and inductive phase angles to provide logical levels for respective phase angles of the signal transmission.

3. The phase sensor circuit according to claim 2 in which said output circuit means includes means for integrating the output pulses of the summing circuit means.

4. The phase sensor circuit according to claim 3 which further includes a frequency divider having an input coupled to the output of summing circuit and an output coupled to said means for integrating.

5. The phase sensor circuit according to claim 1 in which the phase of signal transmission being detected is the phase of an antenna impedance including an antenna and impedance matching network.

6. The phase sensor circuit according to claim 1 which includes a transmission line and the sampling circuit means comprises current and voltage transmission line taps located within a minimum length of transmission line for signal tracking over a broad band frequency range.

7. The phase sensor circuit according to claim 6 which further includes coupling circuit means for individually coupling said current and voltage transmission line taps to said phase detection circuit means, including means for capacitive coupling the current sample through an isolation network.

8. The phase sensor circuit according to claim 7 in which said coupling circuit means further includes a constant load network for coupling the voltage sample to said phase detection circuit means.

9. The phase sensor circuit according to claim 8 in which said coupling circuit means couples current and voltage samples to reference and delay circuits, respectively.

10. The phase sensor circuit according to claim 6 in which said minimum length of transmission line is less than three-quarters of an inch.

11. A digital circuit for extending the range of pulse repetition rates of circuit operation for a broad range of pulse repetition rates comprising:

digital circuit means including a plurality of paths of different time delay to provide an output including a plurality of pulse trains of different phase in response to signals of the same repetition rate; and combining means responsive to the phase differential of said pulse trains provided by said output to produce a pulse train of the combined pulses of lesser time duration that the pulse repetition rate in the time domain.

12. The digital circuit according to claim 11 in which said digital circuit means includes gating circuit means providing different time delay in the plurality of paths to produce the plurality of pulse trains of different time differentials.

13. Signal transmission sampling circuit arrangement comprising:

a signal transmission line including circuit interrupt means for sampling the signal transmission, said circuit interrupt means including voltage and current taps disposed in close proximity on said transmission line for corresponding voltage and current samples;

circuit means maintaining the level of sampling as a minor load over the broad frequency band; and circuit means coupled to the current tap for deriving a voltage analog of the current sample.

14. The sampling circuit according to claim 13 in which the forward voltage wave of signal transmission is derived from the voltage tap and the reverse current wave is derived from the current tap.

* * * * *